(No Model.)
J. KREHBIEL.
FLOAT VALVE.
No. 435,066. Patented Aug. 26, 1890.
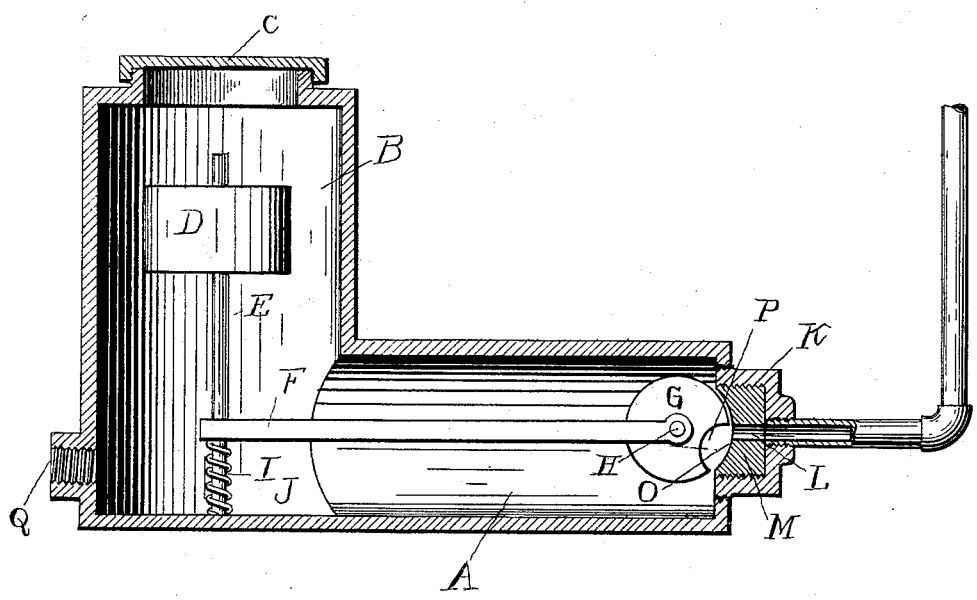
Witnesses:
W. E. Gilbert
P. M. Hulbert
Inventor:
John Krehbiel
By James Whittemore
Att'y

UNITED STATES PATENT OFFICE.

JOHN KREHBIEL, OF KALAMAZOO, MICHIGAN.

FLOAT-VALVE.

SPECIFICATION forming part of Letters Patent No. 435,066, dated August 26, 1890.

Application filed October 29, 1889. Serial No. 328,592. (No model.)

*To all whom it may concern:*

Be it known that I, JOHN KREHBIEL, a citizen of the United States, residing at Kalamazoo, in the county of Kalamazoo and State of Michigan, have invented certain new and useful Improvements in Float-Valves, of which the following is a specification, reference being had therein to the accompanying drawing.

This invention relates to new and useful improvements in float-valves; and the invention consists in the peculiar construction of a rotary valve adapted to close the inlet-opening, in combination with a float operating said valve; and, further, in the peculiar construction, arrangement, and combination of the various parts, all as more fully hereinafter described.

In the drawing which accompanies this specification the figure shows my invention in vertical central section.

A is a casing of any desired shape, preferably having the extension B for the movement of the float. This casing is provided with a suitable cap C, adapted to be screw-threaded into a suitable aperture in the casing, wherein the float D may be inserted. This float is supported upon a vertical rod E, connected at its lower end with the lever F, which connects with the rotary valve G, pivoted in the casing at H.

The outer end of the lever F is provided with a downwardly-projecting lug I, over which is sleeved a spring J.

K is a cap adapted to fit into a suitable aperture in the casing, and in this cap is formed a suitable inlet-opening L, which passes through the casing and through an adjustable seat M, formed on the interior of the cap. This seat has a segmental circular face O, arranged with reference to the rotary valve G. This valve is provided with the cut-away portion P.

Q is the exit-opening for the float.

The parts being thus constructed and arranged, they are intended to operate as follows: The casing being empty, the float will be in its lowest position, as shown in full lines in the drawing, in which position the cut-away portion P of the rotary valve will be opposite to the inlet-aperture in the seat. As the fluid accumulates in the casing, it will raise the float D, which, through the connections described, will turn the valve G, closing the aperture by bringing the valve against the seat. The fluid being lowered, the weight of the float D will lower the end of the lever F, thereby turning the rotary valve G back again to open the inlet-pipe. The opened position of the valve is shown in full lines. The spring J is of sufficient strength to counterbalance the weight of the float, so that the buoyancy of the float acts entirely in controlling the valve.

My valve is especially intended for governing the distribution of oil in connection with oil-burners for stoves, &c. It may, however, be used in connection with steam, water, or other fluids.

The advantage of a construction embodying a curved seat in combination with the rotary valve is that a float of small diameter will be effective against a heavy hydrostatic pressure on account of the great leverage, together with the fact that said pressure does not operate to impede the action of the valve, as in ordinary cases, where a vertically-operating valve is used.

What I claim as my invention is—

1. In a float-valve, the combination, with the casing B, of a float D therein, a stem E on the float, a lever F, connected with the stem, a spring below the lever and stem, a rotary valve on the opposite end of the lever having a cut-out portion P, and a curved adjustable seat in the end of the casing adjacent to the valve, substantially as described.

2. In a float-valve, the combination, with the casing, of a float therein, a stem on the float, a horizontal lever supporting the stem, a spring below the end of the lever and stem, a cut-out rotary valve on the opposite end of the lever, an adjustable seat M, having an opening therein, and a suitable exit-opening formed in the casing, substantially as described.

In testimony whereof I affix my signature, in presence of two witnesses, this 7th day of September, 1889.

JOHN KREHBIEL.

Witnesses:
ED MCBREARTY,
JAMES WHITTEMORE.